US009731776B1

(12) United States Patent
Shen et al.

(10) Patent No.: US 9,731,776 B1
(45) Date of Patent: Aug. 15, 2017

(54) BUMPER GAP AERODYNAMIC SEAL

(71) Applicant: Toyota Motor Engineering & Manufacturing North America, Inc., Erlanger, KY (US)

(72) Inventors: Mingher Fred Shen, Ann Arbor, MI (US); Jared C. Meeks, Chelsea, MI (US); Jesse D. Rydell, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/079,898

(22) Filed: Mar. 24, 2016

(51) Int. Cl.
| | |
|---|---|
| *B62D 35/00* | (2006.01) |
| *B60R 19/02* | (2006.01) |
| *B60R 13/06* | (2006.01) |
| *F16J 15/02* | (2006.01) |
| *B62D 25/08* | (2006.01) |

(52) U.S. Cl.
CPC .............. *B62D 35/00* (2013.01); *B60R 13/06* (2013.01); *B60R 19/023* (2013.01); *B62D 25/08* (2013.01); *F16J 15/025* (2013.01); *F16J 15/027* (2013.01)

(58) Field of Classification Search
CPC ....... B60R 13/06; B60R 19/02; B60R 19/023; B62D 25/08; B62D 35/00; B62D 35/005; F16J 15/02; F16J 15/025; F16J 15/027

USPC .......... 293/113, 115, 120; 296/180.1, 180.2, 296/181.5
See application file for complete search history.

(56) References Cited

U.S. PATENT DOCUMENTS

| | | | |
|---|---|---|---|
| 3,884,516 A * | 5/1975 | Gallion | B60R 19/18 293/117 |
| 6,617,015 B2 | 9/2003 | Rood | |
| 6,849,310 B2 | 2/2005 | Willett | |
| 7,900,982 B2 | 3/2011 | Moore | |
| 8,573,682 B2 | 11/2013 | Oomen | |
| 8,915,538 B2 | 12/2014 | Bland et al. | |
| 2011/0198778 A1 | 8/2011 | Bellmore et al. | |
| 2012/0193156 A1 | 8/2012 | Hirano | |
| 2015/0123310 A1 | 5/2015 | Leonard | |
| 2016/0280168 A1* | 9/2016 | Klop | B60R 13/06 |

\* cited by examiner

*Primary Examiner* — Jason S Daniels
(74) *Attorney, Agent, or Firm* — Christopher G. Darrow; Darrow Mustafa PC

(57) ABSTRACT

A dual position bulb seal is provided for selectively sealing an interface gap between two components of a vehicle. The dual position bulb seal includes an elongated base portion configured for coupling to a first vehicle component. A hollow, bulbous portion may extend from the elongated base portion. A flexible sealing fin upwardly extends from the bulbous portion, along a length of the bulbous portion. The flexible sealing fin may be configured to rest in a first, non-sealing position that permits a flow of air over the flexible sealing fin, and a second, sealing position contacting a second vehicle component such that it prevents a flow of air through the interface gap.

20 Claims, 7 Drawing Sheets

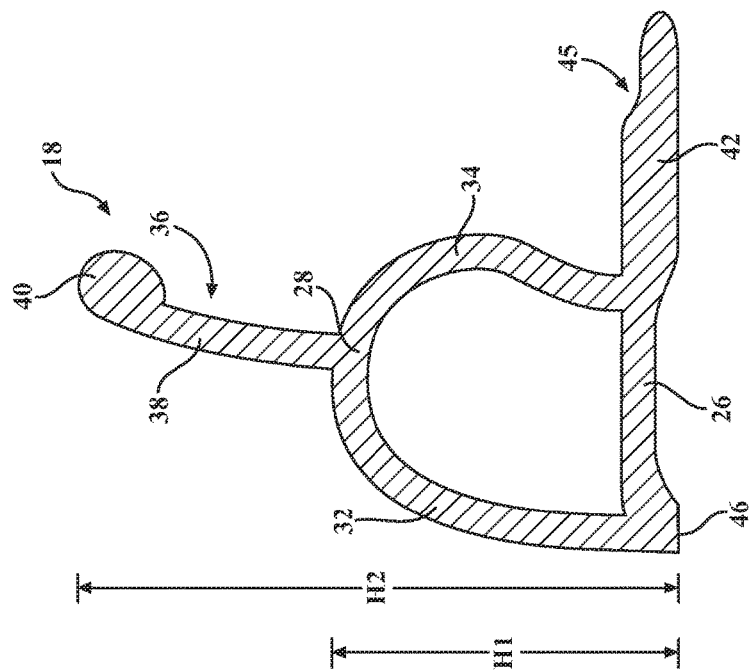
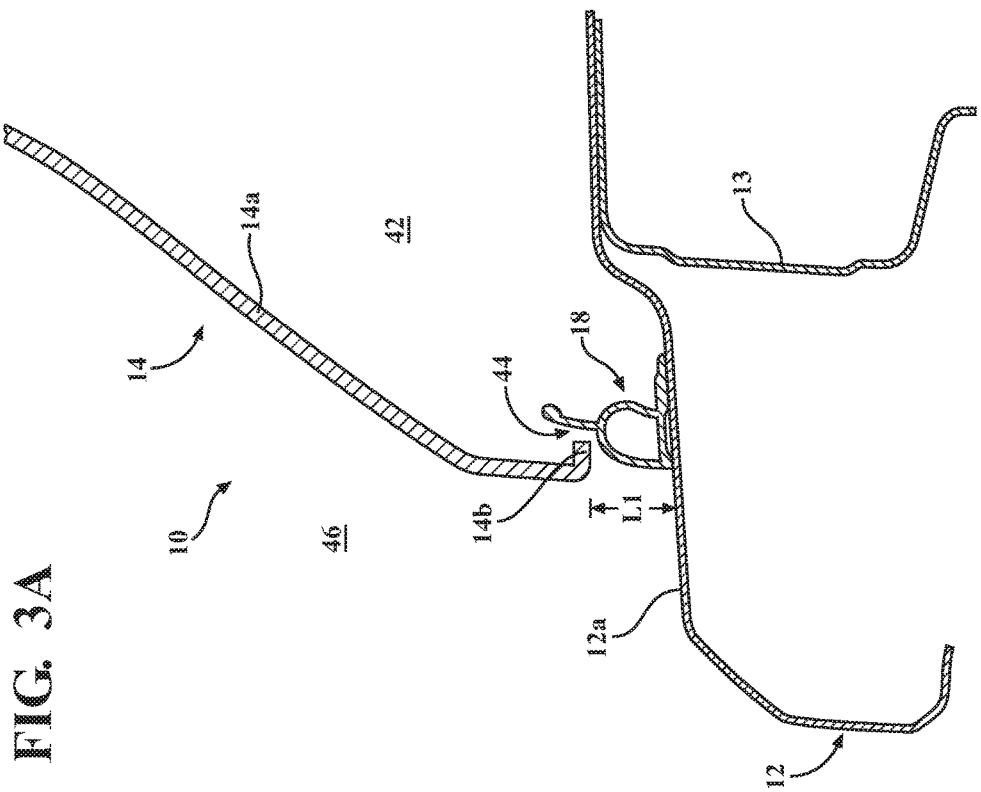

BUMPER GAP AERODYNAMIC SEAL

TECHNICAL FIELD

The present disclosure generally relates to aerodynamic vehicle seals, and more particularly, to sealing an interface gap between a bumper and an adjacent vehicle panel.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Airflow and turbulence at the front end of a vehicle may negatively affect vehicle aerodynamics, ultimately lowering gas mileage and overall vehicle efficiencies. Certain vehicles, such as trucks and utility vehicles that are built on a body-over-frame design, may need to be provided with a large gap between vehicle components, such as a bumper and an adjacent filler panel. For example, the gap may allow for a limited clearance in the event there is a relative movement between the bumper, which may be coupled to a frame or other structural retaining member, and the adjacent filler panel. Such a gap may not be present to the same extent in unibody frame designs. The presence of the gap, however, may negatively influence the vehicle aerodynamics at high speeds. In addition, the presence of a gap may not be visually appealing.

Accordingly, it would be desirable to provide an improved design that allows clearance for movement, while improving both aerodynamics and aesthetics of a vehicle.

SUMMARY

This section provides a general summary of the disclosure, and is not a comprehensive disclosure of its full scope or all of its features.

In various aspects, the present teachings provide a dual position bulb seal for selectively sealing an interface gap between two components of a vehicle. The dual position bulb seal includes an elongated base portion configured for coupling to a first vehicle component. A hollow, bulbous portion may extend from the elongated base portion. A flexible sealing fin upwardly extends from the bulbous portion, along a length of the bulbous portion. The flexible sealing fin may be configured to rest in a first, non-sealing position that permits a flow of air over the flexible sealing fin, and a second, sealing position contacting a second vehicle component such that it prevents a flow of air through the interface gap.

In other aspects, the present teachings provide an assembly for selectively sealing an interface gap between two components of a vehicle. The assembly may include a bumper member coupled to a frame. A filler panel may be provided coupled to the vehicle, such that an upper surface of the bumper member and a lower edge of the filler panel are separated from one another, defining the interface gap. The assembly includes a dual position bulb seal coupled to the bumper member. The dual position bulb seal may include a flexible sealing fin configured to rest in a first, non-sealing position and a second, sealing position. In the first position, the flexible sealing fin permits a flow of air over the flexible sealing fin between the bumper member and the filler panel. In the second position, the flexible sealing fin contacts the filler panel, thereby preventing a flow of air through the interface gap.

In still other aspects, the present teachings provide a method for guiding an airflow produced during a forward movement of a vehicle. The method includes at least partially filling an interface gap of a vehicle cavity in a front area of the vehicle using a dual position bulb seal. The dual position bulb seal may include a flexible sealing fin upwardly extending from a hollow bulbous portion coupled to an elongated base portion. The flexible sealing fin may be configured to selectively be positioned in a first, non-sealing position, and a second, sealing position. The method may include increasing an air pressure in the vehicle cavity during the forward movement of the vehicle. The increase in air pressure moves, or flexes, the flexible sealing fin from the first position to the second position. The movement results in the flexible sealing fin closing the interface gap, guiding the airflow in an upward direction over the vehicle.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3A illustrates a cross-sectional view of the assembly as shown in FIG. 1A taken along the line 3-3, with a flexible sealing fin of the dual position bulb seal in a first, non-sealing position that permits a flow of air through the interface gap and over the flexible sealing fin;

FIG. 3B illustrates a magnified view of the dual position bulb seal as shown in FIG. 3A;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a dual position bulb seal. In various aspects, the bulb seal is configured to selectively prevent or minimize airflow from entering a gap that may be present in the front portion of a vehicle, for example, between a bumper and an adjacent filler panel, which may be referred to herein as a "bumper gap" or an "interface gap." The dual position bulb seal improves aerodynamics of the vehicle without a requirement for a complicated duct passage. The bulb seal according to the present technology reduces design complexity, as well as provides a decrease in cost and a decrease in weight. In various aspects, the bulb seal design includes a flexible fin-type sealing structure design that can accommodate a plurality of different fitting dimensional variations while being able to completely or substantially completely seal the bumper gap.

At low speeds, or when there is no vehicle movement, the flexible sealing fin is configured to be located in a first position, or rest position, permitting air movement between the exterior and an interior vehicle cavity. During forward movement of the vehicle, and particularly at high speeds, an increased air pressure builds up within the interior vehicle cavity. When an interior pressure is higher than an exterior pressure, the flexible sealing fin is configured to flex or move, such that it is located against an end of the filler panel at a second position, or sealing position. In this sealing position, the bumper gap is closed, and wind flow or turbulence at the front end of the vehicle is directed in an upward direction, above the bumper and over the vehicle.

Figure 1A:
FIG. 1A illustrates a partial front, exterior perspective view of an assembly for selectively sealing an interface gap between two components of a vehicle according to various aspects of the present technology.
Figure 1B:
FIG. 1B illustrates a partial rear, interior perspective view of the assembly as shown in FIG. 1A.
Figure 4B:
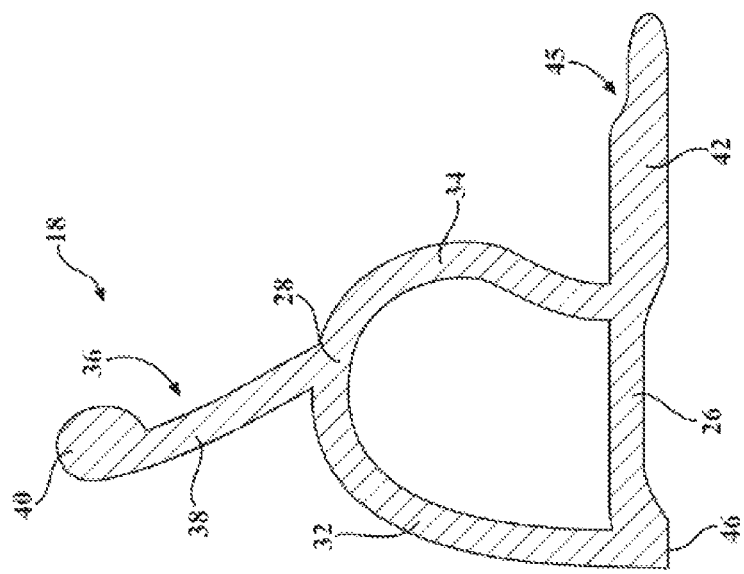
FIG. 4B illustrates a magnified view of the dual position bulb seal as shown in FIG. 4A.
Figure 4A:
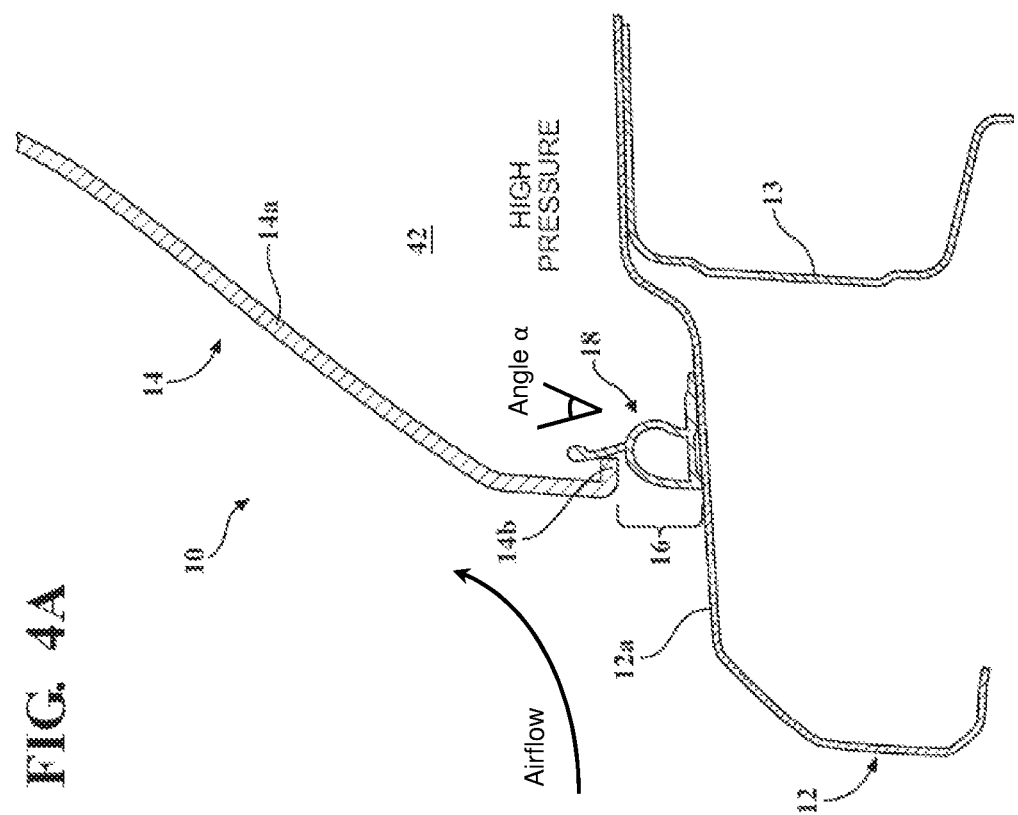
FIG. 4A illustrates a cross-sectional view of the assembly as shown in FIG. 1A taken along the line 3-3, with the flexible sealing fin of the dual position bulb seal in a second, sealing position contacting a vehicle component that prevents a flow of air through the interface gap.

FIG. 1A illustrates a partial front, exterior perspective view of an assembly 10 for selectively sealing an interface gap between first and second components of a vehicle according to various aspects of the present technology. FIG. 1B illustrates a partial rear, interior perspective view of the assembly as shown in FIG. 1A. The assembly 10 may include a bumper cover, or bumper member 12, at least one adjacent filler panel 14, and a dual position bulb seal 18. The bumper member 12 may be coupled to a suitable retaining member, such as a vehicle frame 13, or frame component (as shown in FIGS. 3A and 4A). The filler panel 14 may include a main body portion 14a that terminates at a lower edge 14b. In various aspects, the filler panel 14 is suitably coupled to one or more components of the vehicle (not specifically shown), such that an upper surface 12a of the bumper member 12 and the lower edge 14b of the filler panel 14 are separated from one another, defining the interface gap 16.

Figure 2A:
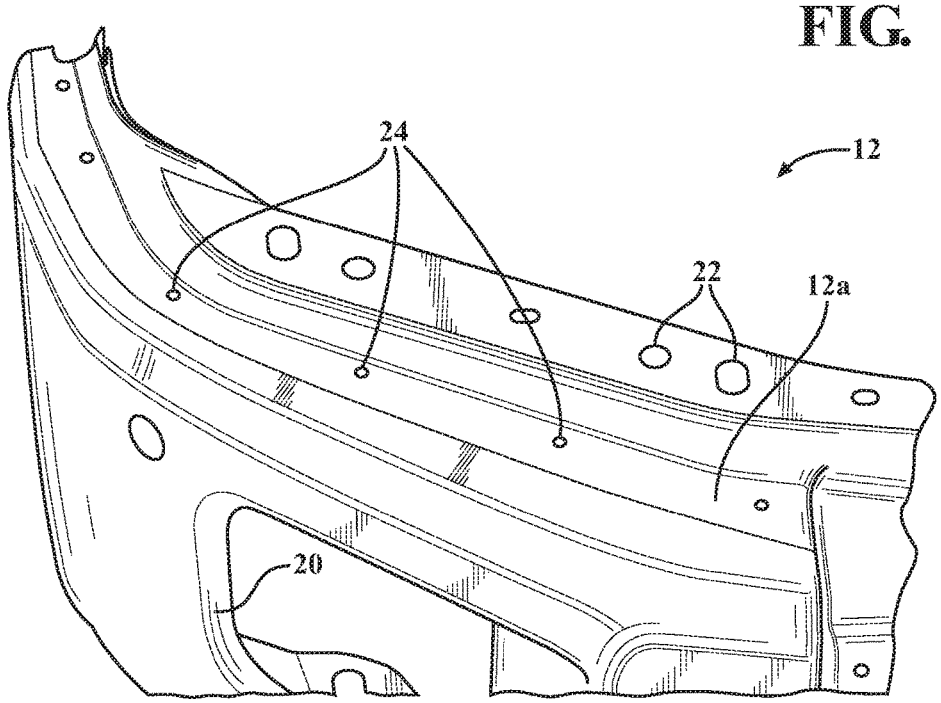
FIG. 2A illustrates a partial perspective view of an exemplary bumper cover.
Figure 2B:
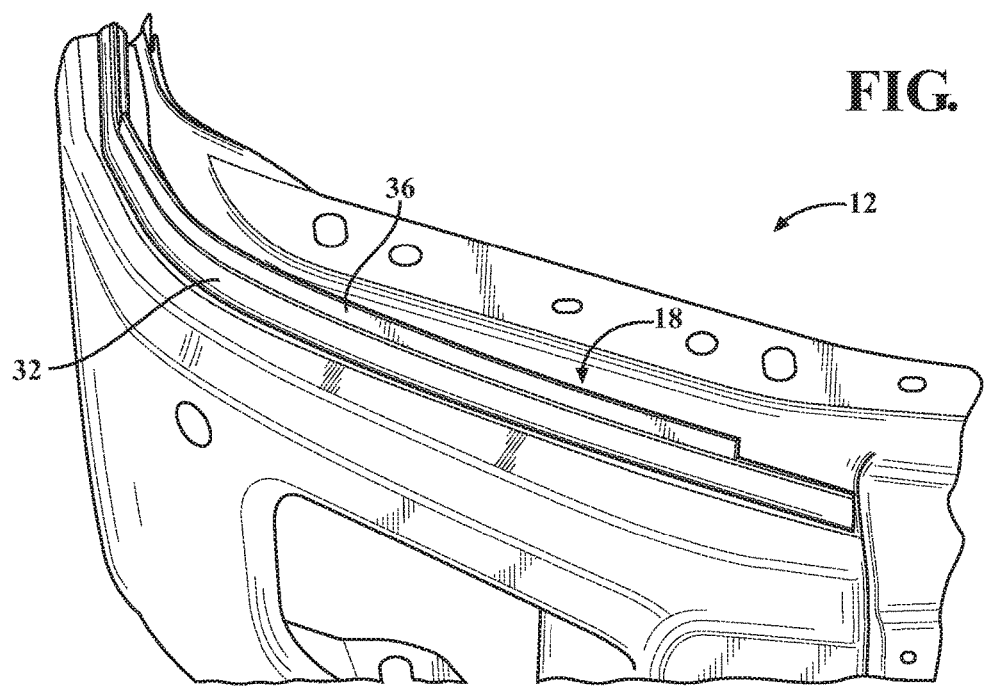
FIG. 2B illustrates a dual position bulb seal according to various aspects of the present technology, coupled to the bumper cover of FIG. 2A.
Figure 2C:
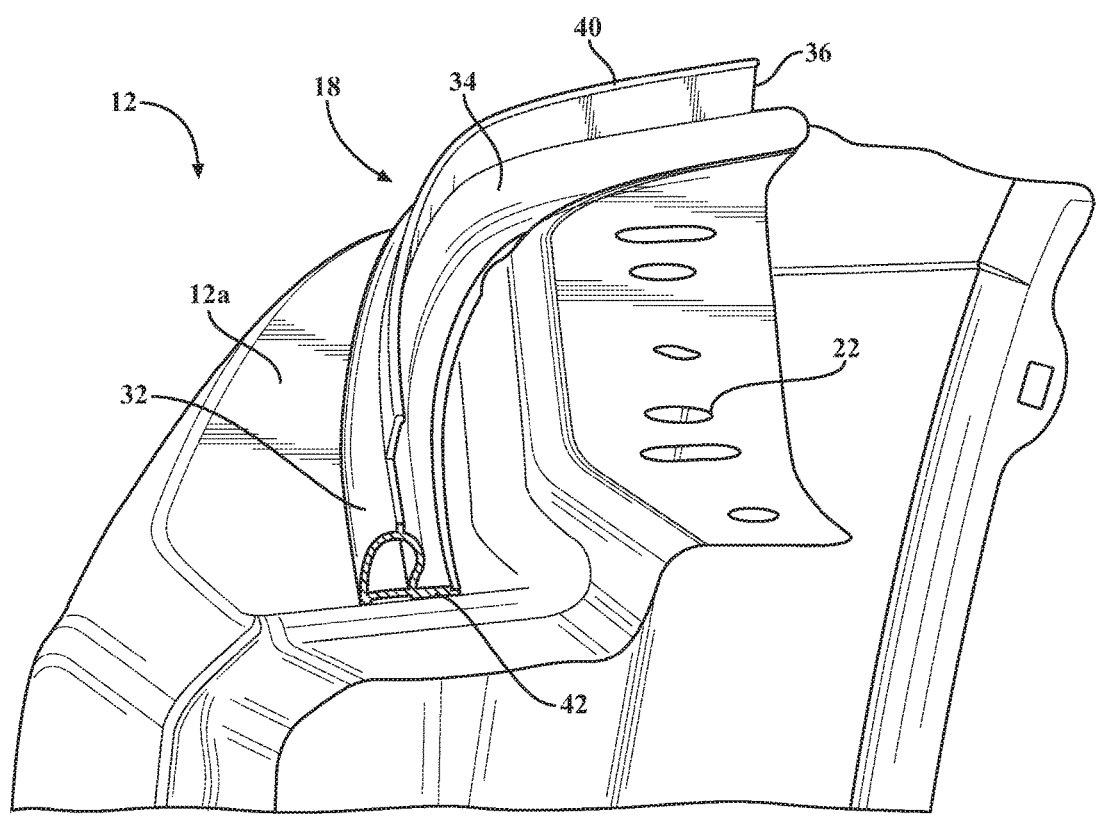
FIG. 2C illustrates a side perspective view of FIG. 2B, showing various details of the dual position bulb seal.

FIG. 2A illustrates a partial perspective view of an exemplary bumper member 12. It should be understood that the bumper member 12 may take various shapes and sizes, as well as define various apertures. For example, it may include one or more aperture 20 for a light, such as a low beam fog light, and a plurality of apertures 22 for coupling the bumper member 12 to a frame 13. A plurality of apertures 24 may also be provided for coupling the dual position bulb seal 18. FIG. 2B illustrates the dual position bulb seal 18 coupled to an upper surface 12a of the bumper member 12. FIG. 2C illustrates a side perspective view of FIG. 2B, illustrating various details of the dual position bulb seal 18.

FIG. 3A illustrates a cross-sectional view of the assembly 10 as shown in FIG. 1A taken along the line 3-3. FIG. 3B illustrates a magnified view of the dual position bulb seal 18 as shown in FIG. 3A. In various aspects, the bulb seal 18 includes an elongated base portion 26 configured for coupling to a first vehicle component, such as an upper surface 12a of the bumper member 12. A hollow, bulbous portion 28 extends from the elongated base portion 26. The bulbous portion 28 may be defined by a curved top region 30 disposed between two upstanding side regions, for example, an exterior side 32 and an interior side 34. The top and side regions 30, 32, 34 may generally be provided with a similar or uniform thickness, although it may be desirable to include certain variations for areas where either additional strength or flexibility is preferred. In various aspects, the top and side regions 30, 32, 34 of the bulbous portion 28 may generally define a cross-sectional area having one of a substantially circular shape and a substantially oval shape. In other aspects, certain regions of the bulbous portion 28 may be provided with a substantially linear, or flat profile.

A flexible sealing fin 36 may be coupled to a center area of the top region 30, upwardly extending therefrom. As shown, the flexible sealing fin 36 may include a stem portion 38 and a top portion 40. The top portion 40 may be shaped as desired to allow for various degrees of flexibility or to better seal the interface gap 16; the top portion 40 is depicted having a curved, or substantially circular shape. As will be described in more detail below, the flexible sealing fin 36 may be configured to flex at an angle of from about 10 to about 60 degrees, or from about 15 to about 45 degrees.

In certain aspects, a base extension fin 42 may also be provided, extending from an end of the elongated base portion 26 in a direction substantially planar with the elongated base portion 26 and parallel to, or otherwise aligned with, the upper surface 12a of the bumper member 12. The base extension fin 42 may also be provided with a degree of flexibility, configured to mate with a shape of the bumper 12 where applicable. As shown, the base extension fin 42 may be provided with a stepped edge 45, or angled edge. The elongated base portion 26 may optionally be provided with an extending foot portion 46, opposite the base extension fin 42. In this regard, the base portion 26, foot portion 46, and base extension fin 42 may cooperate to define a small cavity configured to receive an adhesive for coupling the dual position bulb seal 18 to the bumper member 12.

The depiction shown in FIG. 3A demonstrates the flexible sealing fin 36 of the dual position bulb seal 18 in a first, non-sealing position, or rest position, that permits a flow of air through the interface gap 16 and over the flexible sealing fin 36 and into an interior vehicle cavity 42. The interior vehicle cavity 42 may be defined, in part, by the bumper member 12, filler panel 14, and dual position bulb seal 18. As shown, the flexible sealing fin 36 may generally extend in a direction substantially perpendicular to the elongated base portion 26. In various aspects, this provides a small opening 44 between a lower edge 14b, or inwardly extending lip of the filler panel 14, and the stem portion 38 when the flexible sealing fin 36 is in the rest position. As shown, and in various aspects, the exterior side 32 of the bulbous portion 28 is disposed a small distance inward from the filler panel 14. In other aspects, it may be desirable for the exterior side 32 to be aligned and flush with the filler panel 14.

With reference to FIG. 3B, the bulbous portion 28 defines a first height dimension, designated by reference number H1, and the bulb seal 18, including both the bulbous portion 28 and the flexible sealing fin 36, defines a second height dimension, designated by reference number H2. In various aspects, the second height dimension H2 is between about 1.5 to about 2 times greater than the first height dimension H1. Preferably, the first height dimension H1 is less than a linear dimension of the interface gap, designated by reference number L1 on FIG. 3A, such that a small volume of airflow may freely travel between the exterior environment 46 and the interior vehicle cavity 42 when the vehicle is not in motion or when the air pressure within the interior vehicle cavity to not exceed a threshold value.

FIG. 4A illustrates a cross-sectional view of the assembly as shown in FIG. 1A taken along the line 3-3, with the flexible sealing fin 36 of the dual position bulb seal 18 in the second, sealing position. FIG. 4B illustrates a magnified view of the dual position bulb seal as shown in FIG. 4A. In various aspects, the movement of the flexible sealing fin 36 occurs automatically, for example, during a forward movement of the vehicle. In order for the extending sealing fin 36 to move from the first position to the second position, an air pressure in the interior vehicle cavity 42 needs to be greater than an air pressure of the external environment 46, preferably greater than a predetermined threshold value. For example, the dual position bulb seal 18 can be designed with the flexible sealing fin 36 having a predetermined flexural strength, which may be influenced by thickness, material composition, shapes, and various other design considerations and combinations thereof. Unlike when in the first position, where the flexible sealing fin 36 permits a flow of air over the flexible sealing fin 36 between the bumper member 12 and the filler panel 14, in the second position, the flexible sealing fin 36 is flexed to the point at which it contacts a portion of the filler panel 14, thereby preventing a flow of air through the interface gap 16. In certain aspects, at least one or both of the edge 14b of the filler panel 14 and the flexible sealing fin 38 may be provided with a coordinated shape, contour, or profile to form a close-fitting seal there between.

Figure 5:
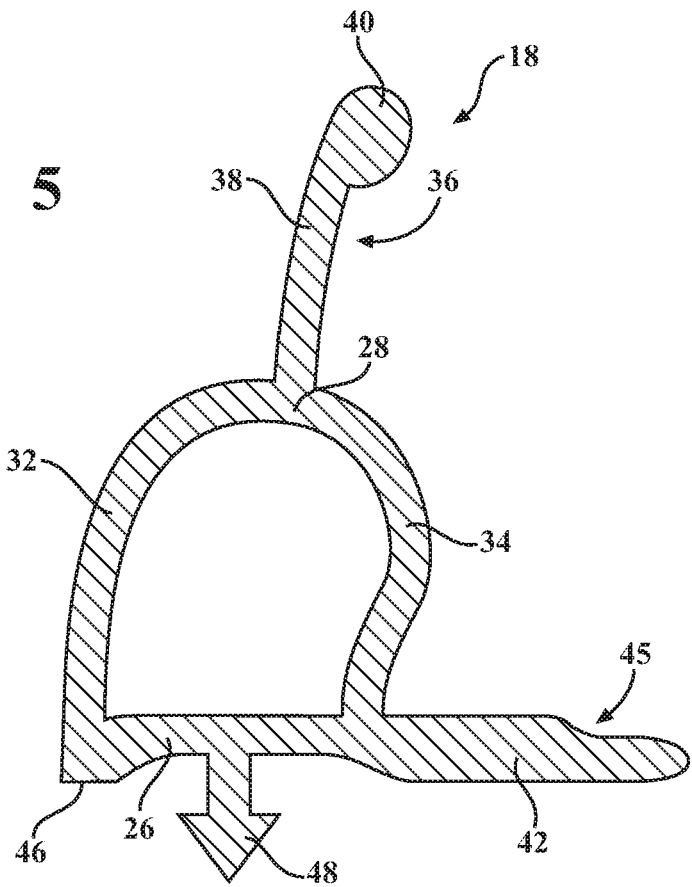
FIG. 5 illustrates the dual position bulb seal of FIG. 3B with an exemplary attachment member for coupling to a bumper cover.

FIG. 5 illustrates the dual position bulb seal 18 of FIG. 3B with an exemplary attachment member 48 for coupling to a vehicle component. In one example, the elongated base portion 26 may be provided with a plurality of integral attachment members 48 extending in a direction opposite the bulbous portion 28 for coupling to apertures 24 defined by the bumper cover, as shown in FIG. 2A. In other aspects, the attachment members 48 may be separately attached components, and not integrally formed with the bulb seal 18. Additionally or alternatively, a suitable adhesive may be used to secure the bulb seal 18 to a vehicle component, as discussed above.

The flexible sealing fin 36 extends along a desired length of the dual position bulb seal 18, and in certain aspects along an entirety of the length. In various aspects, the dual position bulb seal 18 may be configured so that certain portions, such as the flexible sealing fin 36 and/or the base extension fin 42 can be trimmed, partially removed, or fully removed to fit with a design of the adjacent filler panel, bumper member, and/or other objects.

In various aspects, the dual position bulb seal 18 can be formed from a flexible material appropriate for the environmental conditions and temperature ranges commensurate with automotive use. Non-limiting examples of suitable materials and compositions useful with the present technology include rubber, nylon, resins, thermoplastic polymers, thermoplastic elastomer, thermoplastic vulcanizate, and various blends and combinations thereof. In various aspects, the bulb seal may also be provided with up to about 40% by weight of suitable fillers as is known in the art to provide additional desirable features, and/or to effect cost savings. In certain preferred aspects, the dual position bulb seal can be formed using extrusion techniques, to provide the bulb seal as a unitary extruded component. In other aspects, molding techniques can be used in fabrication processes. It is also contemplated that in certain aspects, it may be desirable to combine (i.e., mechanically or adhesively join) one or more components in order to arrive at the dual position bulb seal 18 described herein.

In still other aspects, the present teachings provide methods for guiding an airflow or turbulence produced during a forward movement of a vehicle. With reference to the figures and components described above, the method may include arranging a dual position bulb seal 18 in a front area of the vehicle. For example, the dual position bulb seal 18 can be positioned at least partially filling an interface gap 16 of a vehicle cavity 42 defined by at least two adjacent vehicle components, such as a bumper member 12 and a filler panel 14.

In various examples, the methods may include securing the elongated base portion 28 of the dual position bulb seal 18 to the upper surface 12A of the bumper member 12. In certain aspects, a plurality of attachment members 48 may be aligned and inserted into corresponding apertures 24 defined in the bumper member 12. The dual position bulb seal 18 may include a flexible sealing fin 36 upwardly extending from a hollow bulbous portion 28 coupled to an elongated base portion 26, as described in more detail above. The flexible sealing fin 36 may be configured to selectively be positioned in a first, non-sealing position, and a second, sealing position.

The methods may include increasing an air pressure in the vehicle cavity 42 during the forward movement of the vehicle. The increase in air pressure moves, or flexes, the flexible sealing fin 36 from the first position as shown in FIG. 3A, to the second position as shown in FIG. 4A. In various aspects, the flow of air within the vehicle cavity increases the air pressure in an amount sufficient to move the flexible sealing fin 36 at an angle of from about 10 to about 60 degrees, or from about 15 to about 45 degrees, as indicated by angle $\alpha$ shown in FIG. 4A. The movement results in the flexible sealing fin 36 closing the interface gap 16, thereby guiding the airflow or turbulence caused by the forward movement of the vehicle in an upward direction over the vehicle, as illustrated by the directional arrows in FIG. 4A.

In various aspects, the step of increasing the air pressure may include directing a flow of air within the vehicle cavity 42 in response to the forward movement of the vehicle. As noted above, in the embodiment disclosed in FIGS. 3A and 4A, the vehicle cavity 42 is at least partially defined by an upper surface 12A of the bumper member 12 and an adjacent filler panel 14.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A dual position bulb seal for selectively sealing an interface gap between two components of a vehicle, dual position bulb seal comprising:
    an elongated base portion configured for coupling to a first vehicle component;
    a hollow, bulbous portion extending from the elongated base portion;
    a flexible sealing fin upwardly extending from the bulbous portion,
    wherein the flexible sealing fin is configured to rest in a first, non-sealing position that permits a flow of air over the flexible sealing fin and into an interior vehicle cavity, and a second, sealing position in response to being subjected to an increase in air pressure in the interior vehicle cavity during a movement of the vehicle, with the flexible sealing fin contacting a second vehicle component that prevents the flow of air through the interface gap.

2. The dual position bulb seal of claim 1, wherein the bulbous portion comprises a curved top region disposed between two upstanding side regions.

3. The dual position bulb seal of claim 2, wherein the flexible sealing fin is coupled to a center area of the curved top region.

4. The dual position bulb seal of claim 2, wherein the flexible sealing fin extends in a direction substantially perpendicular to the elongated base portion in the first, non-sealing position.

5. The dual position bulb seal of claim 1, wherein the bulbous portion defines a first height dimension, and the dual position bulb seal defines a second height dimension, the second height dimension being between about 1.5 to about 2 times greater than the first height dimension.

6. The dual position bulb seal of claim 1, further comprising a base extension fin, extending from the elongated base portion in a direction substantially planar with the elongated base portion and parallel to an upper surface of the first vehicle component.

7. The dual position bulb seal of claim 1, wherein the elongated base portion comprises a plurality of integral attachment members extending in a direction opposite the bulbous portion for coupling to the first vehicle component.

8. The dual position bulb seal of claim 1, wherein the flexible sealing fin is configured to flex at an angle of from about 15 to about 45 degrees between the first and second positions.

9. The dual position bulb seal of claim 1, formed as a unitary extruded component.

10. The dual position bulb seal of claim 1, wherein the first vehicle component comprises a bumper member and the second vehicle component comprises a filler panel.

11. An assembly for selectively sealing an interface gap between two components of a vehicle, the assembly comprising:
    a bumper member coupled to a frame;
    a filler panel coupled to the vehicle, the bumper member and a lower edge of the filler panel being separated from one another and defining the interface gap; and
    a dual position bulb seal coupled to the bumper member, the dual position bulb seal comprising a flexible sealing fin configured to rest in a first, non-sealing position permitting a flow of air over the flexible sealing fin between the bumper member and the filler panel and into an interior vehicle cavity, and a second, sealing position in response to being subjected to an increase in air pressure in the interior vehicle cavity during a movement of the vehicle, with the flexible sealing fin contacting the filler panel, thereby preventing the flow of air through the interface gap.

12. The assembly of claim 11, wherein the filler panel comprises a lower lip portion, and the flexible sealing fin is configured to engage the lower lip portion in the second, sealing position.

13. The assembly of claim 11, wherein dual position bulb seal comprises a hollow bulbous portion including a curved top region disposed between two upstanding side regions, and the flexible sealing fin is coupled to a center area of the curved top region.

14. The assembly of claim 11, wherein the flexible sealing fin is configured to flex at an angle of from about 15 to about 45 degrees between the first and second positions when subjected to an increase in air pressure caused by a forward movement of the vehicle.

15. The assembly of claim 11, wherein the dual position bulb seal further comprises a base extension fin extending from an elongated base portion in a direction substantially parallel to an upper surface of the bumper member.

16. The assembly of claim 11, wherein the vehicle comprises a body-on-frame construction.

17. A method for guiding an airflow produced during a forward movement of a vehicle, the method comprising:
    arranging a dual position bulb seal in a front area of the vehicle to at least partially fill an interface gap of a vehicle cavity, the dual position bulb seal comprising a flexible sealing fin upwardly extending from a hollow bulbous portion coupled to an elongated base portion, the flexible sealing fin configured to selectively be positioned in a first, non-sealing position, and a second, sealing position;

increasing an air pressure in the vehicle cavity during the forward movement of the vehicle, thereby moving the flexible sealing fin from the first position to the second position, resulting in the flexible sealing fin closing the interface gap, guiding the airflow in an upward direction over the vehicle.

18. The method according to claim 17, wherein increasing the air pressure comprises directing a flow of air within the vehicle cavity, the vehicle cavity being at least partially defined by an upper surface of the bumper member and an adjacent filler panel.

19. The method according to claim 18, further comprising securing the elongated base portion of the dual position bulb seal to the upper surface of the bumper member.

20. The method according to claim 18, wherein the flow of air within the vehicle cavity increases the air pressure in an amount sufficient to move the flexible sealing fin at an angle of from about 15 degrees to about 45 degrees from the first position to the second position.

* * * * *